Dec. 9, 1930.   V. L. SMITHERS   1,784,118
TIRE AND METHOD FOR MARKING THE SAME
Filed Sept. 21, 1928

INVENTOR.
VERNON L. SMITHERS.
BY Ely + Barrow
ATTORNEYS.

Patented Dec. 9, 1930

1,784,118

UNITED STATES PATENT OFFICE

VERNON L. SMITHERS, OF AKRON, OHIO

TIRE AND METHOD FOR MARKING THE SAME

Application filed September 21, 1928. Serial No. 307,523.

This invention relates to vehicle tires of rubber and method for marking the same.

The general purpose of the invention is to provide a tire of distinctive appearance and a method for marking such a tire.

Specifically the invention has for an object the provision of a tire with circumferential bands on its side walls defined by spaced circumferential ribs and divided by radial webs into a series of arcuate sections receiving and confining coatings such as colored rubber cements of contrasting colors.

A further object of the invention is to provide a method for marking tires comprising forming circumferential bands on the side walls thereof defined by circumferential ribs, the bands being divided into a plurality of arcuate sections by radial webs and applying coatings of contrasting colors to the arcuate sections between the webs, the latter preventing blending of the coatings at the ends of the arcuate sections.

The foregoing and other objects of the invention are attained in the tire illustrated in the accompanying drawings and described below and by the method disclosed for marking said tire. It is to be understood that the invention is not limited to the specific form thereof shown and described.

Of the accompanying drawings.

Figure 1:
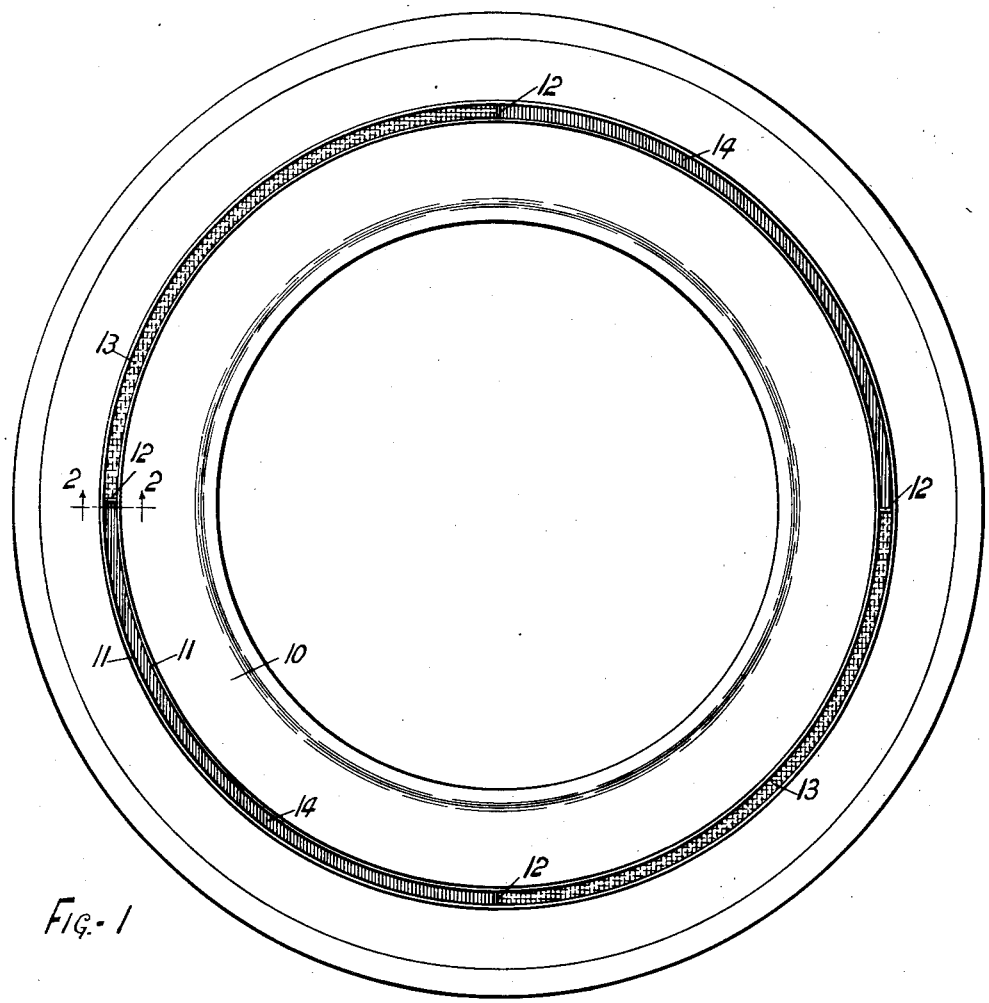
Figure 1 is a side elevation of a tire embodying the invention.
Figure 2:
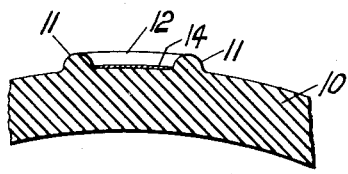
Figure 2 is an enlarged detail section on line 2—2 of Figure 1.
Figure 3:
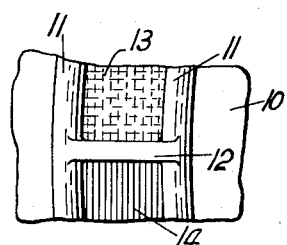
Figure 3 is an enlarged elevation of the portion of the tire shown in Figure 2.

Referring to the drawings, the tire 10 is formed with spaced circumferential ribs 11, 11 defining bands about the side walls of the tire and these bands are divided by radial webs 12, 12 into a plurality of arcuate sections. The tire is vulcanized in this form and then rubber cements of contrasting colors are applied between the ribs 11 in the several arcuate sections defined by webs 12, for example, a yellow cement may be applied at 13, 13 and a red cement at 14, 14. The cements can be applied by painting them thereon or spraying through suitable stencils as desired, and are prevented from running together at the ends of the arcuate band sections by the webs 12 which serve to clearly demark the arcuate sections.

It will appear from the foregoing that a simple, effective tire construction has been provided to present a distinctive appearance and that an inexpensive procedure has been developed for so marking a tire. Obviously modifications of the invention may be resorted to without departing from the spirit thereof or the scope of the appended claims.

What is claimed is:—

1. A tire construction formed with spaced, circumferential ribs on the side walls of the tire to define a flat circumferential band and also formed with radial webs of a height equal to said ribs across said band dividing it into a plurality of arcuate sections, said band having rubber cements of contrasting colors applied thereto in the arcuate sections, said webs preventing running of the cements together at the ends of the sections when they are applied and also distinctly demarking the arcuate sections.

2. A method for marking tires comprising forming spaced circumferential ribs thereon to define flat bands about the side walls of the tire and also forming radial webs across the bands dividing them into a plurality of arcuate sections, and applying rubber cements of contrasting colors to said arcuate sections, said cements being prevented from running together at the ends of the sections by said webs.

3. A method for marking tires comprising forming two spaced circular ribs thereon to define a circular band and also forming radial webs between said ribs dividing said band into a plurality of sections, and applying cements of contrasting colors to said sections, the webs preventing the cements from running together at the ends of the sections.

VERNON L. SMITHERS.